May 30, 1939.   H. RABINOWITZ ET AL   2,160,517
COMBINATION METAL CAP AND DAUBER
Filed April 26, 1937
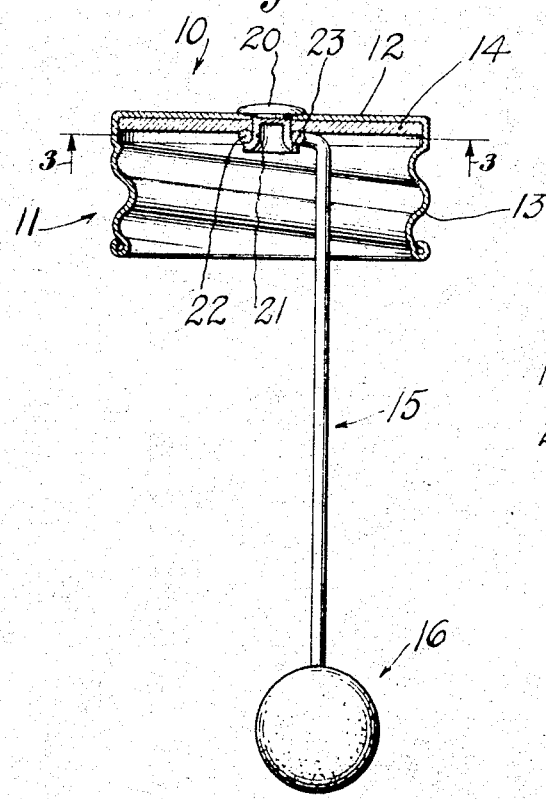
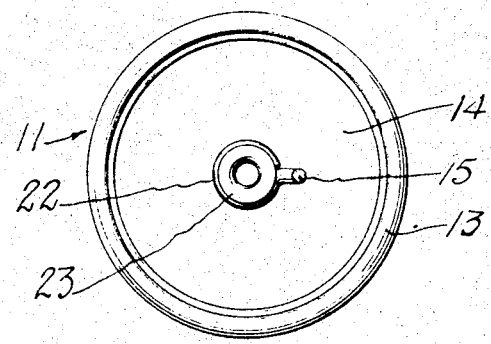
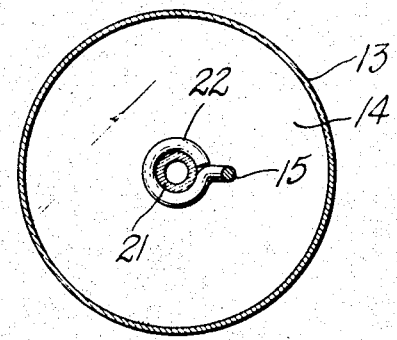
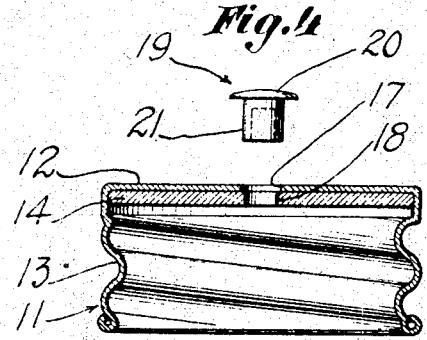
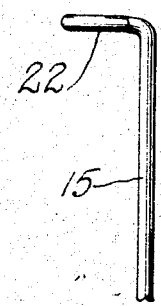
INVENTORS
Harry Rabinowitz and
Murray Rabinowitz
BY
Miss Shumacher ATTORNEY.

Patented May 30, 1939

2,160,517

UNITED STATES PATENT OFFICE 2,160,517

COMBINATION METAL CAP AND DAUBER

Harry Rabinowitz and Murray Rabinowitz, Brooklyn, N. Y.

Application April 26, 1937, Serial No. 138,888

2 Claims. (Cl. 91—67.2)

This invention relates to devices such as combination closures and tool holding members.

Heretofore, in combination container closures and wires for holding tools or daubers that are disposed in the containers, it has been considered necessary to force the wires into a cork body or stopper or into a bore formed in a projection of a Bakelite cap. In certain cases the wires have been formed with irregularities to increase the securement as by wedging or screwing, and resort has even been had to auxiliary locking devices for the wire especially in the case of Bakelite caps. While cork permitted a simple frictional engagement, it possessed an essential drawback in being unduly expensive. Although the Bakelite cap was cheaper than the cork stopper, nevertheless the serious problem of breakage was encountered in securing the wire, since Bakelite is very brittle and comparatively low in tensile strength.

Substantially cheaper and stronger than Bakelite is the common metallic screw cap. Nevertheless it has not been known heretofore how to provide a practical, cheap way of securing the wire to the metal closure. Obviously welding or soldering would be unduly expensive. Moreover, any securement provided must be adapted to permit the closure to remain absolutely fluidtight. A minimum number of parts must be used to require as little handling as possible. The assembling should be effected in one operation in an axial manner to lend itself to simplified manufacturing processes.

It is therefore one object of the invention to provide a device of the character described having a minimum number of simple parts and which are arranged and coordinated in an improved manner to result in a fluidtight structure, which is adapted for inexpensive assembling, and in which an otherwise conventional screw cap may desirably be used, and which structure is neat, compact, durable, reliable and efficient, represents a substantial saving in cost, and is applicable to a conventional container in the well known manner.

Since the device comprises an elongated wire or rod element carrying a tool, it is essential that the securement be quite strong and rigid, so that the closure can be used as a finger grip portion for manipulating the tool. This, in a device which must be extremely simple, has apparently limited the art to the use of drive and wedge fits for the wire. If riveting were resorted to, the problem of making the rivet joint fluidtight would still remain.

It is therefore a further object of the invention to provide a device of the nature set forth which avoids all of the above mentioned difficulties and which fulfills all of the requirements that must be made in the interest of practicability.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a vertical sectional view of a device embodying the invention.

Fig. 2 is a bottom view thereof, with a part removed.

Fig. 3 is a sectional view taken on the line 3—3 of Fig. 1.

Fig. 4 is a view of the device with the parts thereof separated, but arranged for assembling.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same may include a closure 11 of any suitable type adapted to close a container, this closure preferably including a component of sheet material and being desirably illustrated as consisting of a metal closure cap. The same may have a circular top wall 12 and a depending annular screw threaded side wall 13. To assure rapid inexpensive manufacture of this closure cap, relatively soft metal is used for its construction. Within the closure cap and disposed against the wall 12 is snugly fitted a liner disk 14 of any suitable well known material. Connected to the closure cap within the same and extending downward therefrom, is an element 15 which may illustratively be in the nature of a rod or wire that carries at its lower end a suitable tool or work performing member 16. The latter may, for example, represent a dauber or applicator such as may be used in the dispensing or for the application of liquids such as cleaners, polishes, glues, and other fluids.

Formed in the wall 12 and in the liner 14 are the respective alined perforations 17, 18, these being in generally central relation to the closure. Preferably the perforation 18 is somewhat smaller in diameter than the perforation 17.

A rivet 19 is adapted to snugly fit the perforation 17 and to slightly expand or enlarge the perforation 18 so as to assure snug contact between the rivet and the liner 14. While rivets of various sizes, shapes, and constructions may be employed, it is preferred for simplicity to utilize a well known hollow rivet having a head 20 which forms a closure therefor, and a depending tubular portion 21 which is expandible for securement.

The element 15 may have its upper end portion formed in a coil 22 which lies in the plane generally at right angles to the main body of the element 15. This coil 22 is adapted to comparatively snugly fit around the rivet 19. When the rivet is headed over at its lower end, there results an annular flange forming head 23 which overlies the coil 22 so as to powerfully secure the element 15 in a rigid manner to the closure 11. Since the liner 14 is positioned between the coil 22 and the wall 12, the liner is strongly compressed at the perforations 17 and 18 to effectively grip around and against the rivet 19 and to permit the liner to be pressed against the wall 12 at said perforations to form a fluid-tight joint. The coil 22 serves as a washer to equalize and distribute on the liner the stress caused by the upset head 23 and to prevent cutting of the liner 14 by the severe impact exerted in forming the head. The liner 14 is only slightly compressible so as to be well adapted to assume an ample degree of pressure. Since the coil 22 consists of round wire, its main line of pressure contact with the liner 14 is spaced from the edge of the perforation 18 so as to cause the edge portion at 18 to be pressed radially inward and to avoid any possibility of the liner being pressed away or separated from the shank of the rivet.

In assembling, the closure and liner may have been initially formed with the perforations 17 and 18. The rivet and coil 22 may then be disposed in coaxial relation and may be brought together to be assembled into the complete device of Fig. 1 in a single operation.

In use the tool holding element 15 may be inserted into a container at will and manipulated by means of the closure acting as a finger piece. To close the container the cap is screwed thereon with the tool holding element being safely housed within the container.

It will be appreciated that an essential feature of the invention resides in the provision of a metal closure carrying therein a container sealing liner and rivet extending through a wall of the cap and through the liner and serving to compress the liner to assure fluid-tightness at the joint, with the lower end of the rivet suitably carrying a tool holding element. The essential principle is embodied in the novel-co-ordination of the rivet with the closure and tool holding rod. Another advantage resides in that a head of the rivet may under impact form or shape the adjacent wall of the closure, due to the soft metal of which the latter consists so as to thus directly tend to provide a liquid-tight joint. The device is extremely simple to manufacture and assemble and lends itself readily to quantity production and fulfills the objects of the invention.

We claim:

1. A device including a one piece metallic screw cap having a top disc-like portion and a depending threaded skirt portion, a liner of relatively soft material in the cap disposed against said top portion, the latter and the liner having alined perforations, a one piece wire member adapted to carry a dauber at one end and having its other end laterally bent and formed into a closed coiled portion of round wire in register with said perforations, and a rivet extending snugly through said perforations and said coiled portion and having a closed head externally sealingly engaging the top portion, the rivet having a hollow portion expanded over the coiled portion for securing the wire member, the coiled portion clamping the liner against said top portion about the perforation therein, and the rim portion of said perforation being downwardly deformed to provide an annular seat for the said head of the rivet.

2. A device including a container closure having a disc portion for closing the mouth of a container, a liner of relatively soft material disposed against the underside of the disc portion, a wire member having an integral laterally extending closed coiled portion disposed against the underside of the liner, the disc portion and liner having openings registering with the coiled portion, a rivet relatively snugly fittted in said perforations and in said coiled portion and having at one end a closed sealing head and at its other end an expanded securing annular portion, the opening in the liner being initially smaller than the diameter of the rivet whereby the liner is snugly compressed about the rivet by pressure caused by the rivet, and the rim portion of the perforation in the disc portion being annularly downwardly deformed for increased sealing pressure on the liner.

HARRY RABINOWITZ.
MURRAY RABINOWITZ.